(12) United States Patent
McAuliffe (10) Patent No.: US 9,604,783 B2
(45) Date of Patent: Mar. 28, 2017

(54) SYSTEM AND METHOD FOR MAINTAINING A MINIMUM SEPARATION BETWEEN PALLETS POSITIONED ON ADJACENT RACKS

(71) Applicant: Kevin McAuliffe, Indian Trail, NC (US)

(72) Inventor: Kevin McAuliffe, Indian Trail, NC (US)

( * ) Notice: Subject to any disclaimer, the term of this patent is extended or adjusted under 35 U.S.C. 154(b) by 24 days.

(21) Appl. No.: 14/324,840

(22) Filed: Jul. 7, 2014

(65) Prior Publication Data

US 2015/0014262 A1  Jan. 15, 2015

Related U.S. Application Data

(60) Provisional application No. 61/843,538, filed on Jul. 8, 2013.

(51) Int. Cl.
*B65G 1/14* (2006.01)
*B65G 1/02* (2006.01)

(52) U.S. Cl.
CPC .... *B65G 1/14* (2013.01); *B65G 1/02* (2013.01)

(58) Field of Classification Search
CPC ..... A47B 47/027; A47B 47/028; A47B 96/02; A47B 96/00; B65G 1/02; B65G 2207/40; B65G 1/14
USPC ...................................... 211/71.01
See application file for complete search history.

(56) References Cited

U.S. PATENT DOCUMENTS

| | | | |
|---|---|---|---|
| 3,802,574 A * | 4/1974 | Weider ................... | 211/134 |
| 4,757,967 A * | 7/1988 | Delmore ............... | E04B 2/7453 248/218.4 |
| 5,209,444 A * | 5/1993 | Rinderer ............... | H02G 3/126 248/205.1 |
| 5,584,624 A * | 12/1996 | DeVoursney .......... | 410/143 |
| 5,664,688 A * | 9/1997 | Kitanaka et al. ....... | 211/26 |
| 6,173,846 B1 * | 1/2001 | Anderson ............... | 211/183 |
| 7,255,315 B2 * | 8/2007 | Oh ......................... | A62C 35/68 169/43 |
| 7,578,101 B2 * | 8/2009 | Ganske ................. | E04F 21/185 248/544 |
| 7,784,413 B2 * | 8/2010 | Gabriel et al. ........ | 108/60 |
| 9,004,422 B2 * | 4/2015 | Feenstra ............... | A62C 35/68 248/200.1 |
| 2009/0084746 A1* | 4/2009 | Rioux ................... | 211/183 |
| 2010/0078399 A1* | 4/2010 | Higueroa et al. ..... | 211/71.01 |

(Continued)

*Primary Examiner* — Korie H Chan
(74) *Attorney, Agent, or Firm* — Hammer & Associates, P.C.

(57) ABSTRACT

A system is provided for maintaining a minimum separation between a first pallet positioned on a first rack and a second pallet positioned on a second rack. The system comprises a double back stop that includes a first back stop attached to the first rack to prevent lateral movement of the first pallet beyond the first back stop. The double back stop also includes a second back stop attached to the second rack to prevent lateral movement of the second pallet beyond the second back stop. A minimum distance is maintained between the first and second backstops such that the minimum separation is maintained. The double back stop also includes a middle section to connect the first back stop to the second back stop. Methods are also provided for forming the double back stop and for maintaining the minimum separation between the first pallet and the second pallet.

12 Claims, 5 Drawing Sheets

(56) References Cited

U.S. PATENT DOCUMENTS

2010/0219146 A1* 9/2010 Hamby et al. .............. 211/134
2012/0067838 A1* 3/2012 Lawson et al. ............. 211/134
2013/0105428 A1* 5/2013 Yaniak et al. .............. 211/168

* cited by examiner

SYSTEM AND METHOD FOR MAINTAINING A MINIMUM SEPARATION BETWEEN PALLETS POSITIONED ON ADJACENT RACKS

CROSS-REFERENCE TO RELATED APPLICATIONS

This application is a Non-Provisional Application that claims the benefit of U.S. Provisional Patent Application No. 61/843,538, filed Jul. 8, 2013, which is incorporated herein by reference.

FIELD OF THE INVENTION

The present invention relates to racks for mounting pallets, and more particularly, to a system and method for maintaining a minimum separation between pallets mounted on adjacent racks.

BACKGROUND OF THE INVENTION

Pallets are flat transport structures that support goods in a stable fashion as the pallet is lifted by a jacking device such as a forklift, for example. A pallet is the structural foundation of a unit load that enhances handling and storage efficiencies. Goods or shipping containers are often placed on a pallet and secured with strapping, stretch wrap or shrink wrap and then subsequently shipped. While most pallets are made of wood, pallets may also be made from plastic and metal material.

In a warehouse environment, pallets are routinely stored on racks which permit the pallets to be stacked on top of one another in a column form. The racks are typically spaced apart from one another by a sufficient distance, so that stacked pallets on one rack can overhang the rack and still maintain a separation from stacked pallets that overhang an adjacent rack. For safety reasons, various insurance and/or legal regulations require a minimum separation between the stacked pallets on adjacent racks. For example, in the event of a fire in the warehouse, these minimum separation regulations may facilitate water coverage from overhead sprinkler systems between the stacked pallets. The minimum separation regulations may depend on the specific insurance and/or legal regulations.

Figure 1:
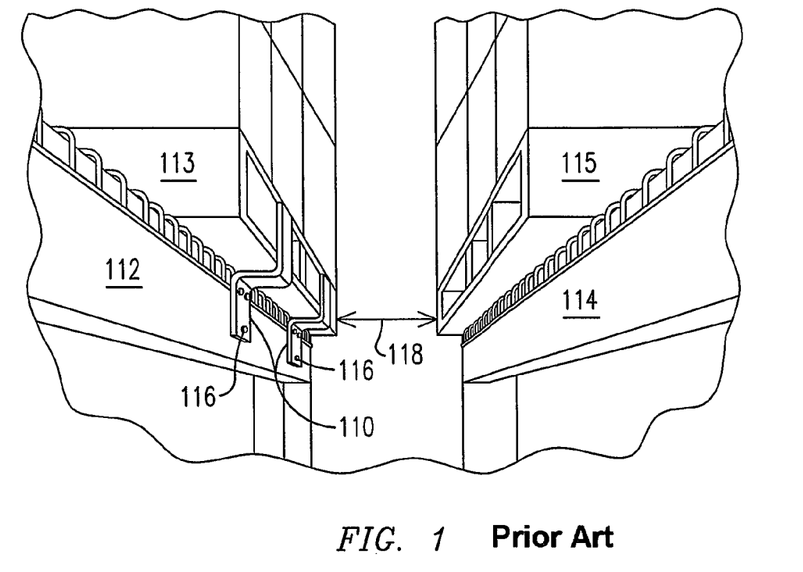
FIG. 1 is an end view of an exemplary embodiment of a conventional Z-stop bracket attached to a rack to engage a pallet positioned on the rack.

Various conventional approaches have been proposed to provide a separation between the stacked pallets on adjacent racks, in order to comply with these insurance and/or legal regulations. FIG. 1 illustrates one such approach including a Z-stop bracket 110 to attempt to provide a separation 118 between a first pallet 113 positioned on a first rack 112 and a second pallet 115 positioned on a second rack 114. As illustrated in FIG. 1, the Z-stop bracket 110 is attached to the first rack 112 using an attachment means 116, such as bolts, for example. The first pallet 113 overhangs the first rack 112 and engages the Z-stop bracket 110 in an effort to maintain the separation 118. An additional Z-stop bracket (not shown) may be attached to the second rack 114 in a similar manner as the Z-stop bracket 110 attached to the first rack 112, to engage the second pallet 115 and maintain the separation 118.

BRIEF DESCRIPTION OF THE INVENTION

In one embodiment of the present invention, a system is provided for maintaining a minimum separation between a first pallet positioned on a first rack and a second pallet positioned on a second rack. The system comprises a double back stop that includes a first back stop configured to attach to the first rack and to prevent lateral movement of the first pallet beyond the first back stop. The double back stop also includes a second back stop configured to attach to the second rack and to prevent lateral movement of the second pallet beyond the second back stop. A minimum distance is maintained between the first and second backstops such that the minimum separation is maintained between the first and second pallets. The minimum distance is maintained by a middle section that connects the first back stop to the second back stop.

In another embodiment of the present invention, a method is provided for forming a double back stop to maintain the minimum separation between the first pallet positioned on the first rack and the second pallet positioned on the second rack. The method includes providing an integral piece of material and bending the integral piece of material at a first line to form a first back stop member to prevent lateral movement of the first pallet beyond the first back stop member. The method also includes bending the integral piece of material at a second line spaced from the first line by the minimum separation to form a second back stop member to prevent lateral movement of the second pallet beyond the second back stop member and to form a horizontal cross member extending the minimum separation between the first back stop member and the second back stop member.

In another embodiment of the present invention, a method is provided for maintaining the minimum separation between the first pallet positioned on the first rack and the second pallet positioned on the second rack. The method includes providing a double back stop including a first back stop, a second back stop and a middle section connecting the first back stop to the second back stop such that the first back stop and the second back stop are spaced apart by a minimum distance as determined by the middle section. The method further includes attaching the first back stop to the first rack and the second back stop to the second rack. The method further includes positioning the first pallet on the first rack and the second pallet on the second rack. The method further includes inhibiting lateral movement of the first pallet beyond the first back stop and the second pallet beyond the second back stop such that the minimum separation is maintained between the first pallet and the second pallet.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

In describing particular features of different embodiments of the present invention, number references will be utilized in relation to the figures accompanying the specification. Similar or identical number references in different figures may be utilized to indicate similar or identical components among different embodiments of the present invention.

The inventor of the present invention recognized that the conventional approaches to attempt to maintain a separation between the pallets on adjacent racks have several drawbacks. For example, the inventor of the present invention recognized that the installation process for securing the Z-stop bracket 110 to the rack 112 of FIG. 1 is cumbersome, requiring extensive attachment means, such as multiple through bolts. Thus, the inventor proposed the system described herein, which includes a double back stop that involves minimal installation steps, to attach to adjacent racks and maintain a minimum separation between pallets positioned on the adjacent racks.

Additionally, the inventor of the present invention recognized that the Z-stop bracket 110 is inherently weak relative to typical lateral loads imposed by the pallets 113, 115 and thus frequently bends during use, thereby failing to maintain the separation 118 between the pallets 113, 115. Thus, the inventor proposed the system with the double back stop described herein, which maintains structural integrity in the presence of typical lateral loads imposed by pallets 113, 115 and thus maintains a minimum separation between pallets positioned on adjacent racks.

Figure 2:
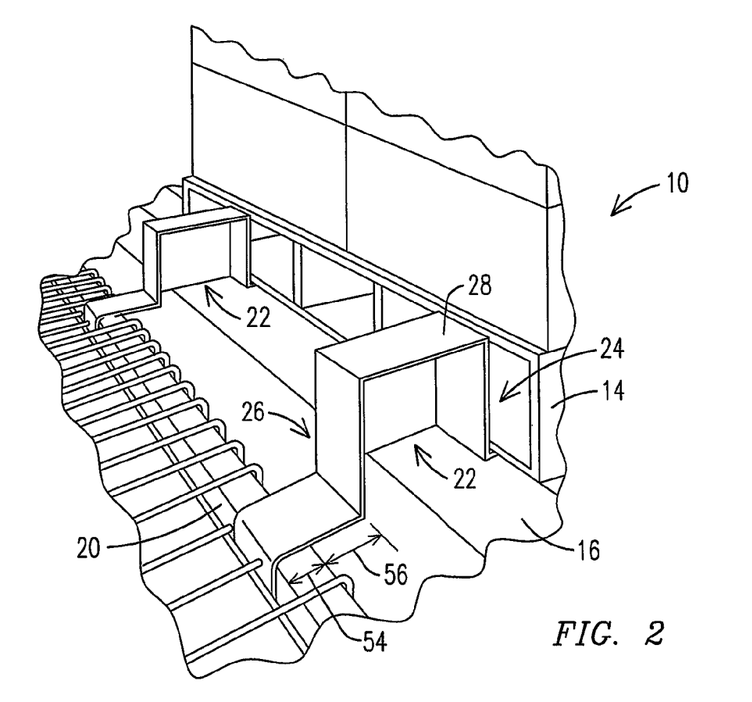
FIG. 2 is a perspective view of an exemplary embodiment of a system for maintaining a minimum separation between a first pallet positioned on a first rack and a second pallet positioned on a second rack according to the present invention.
Figure 3:
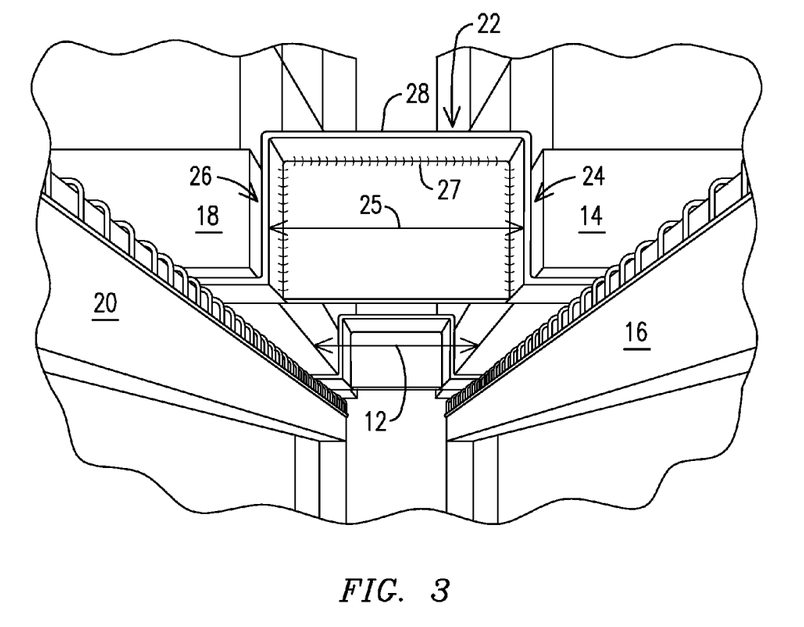
FIG. 3 is a bottom perspective view of the system of FIG. 2.

FIGS. 2-3 illustrate a system 10 for maintaining a minimum separation 12 between a first pallet 14 positioned on a first rack 16 and a second pallet 18 positioned on a second rack 20. A double back stop 22 is attached to the first rack 16 and the second rack 20, to maintain the minimum separation 12 between the first pallet 14 and the second pallet 18. For purposes of clarity, FIG. 2 omits the second pallet 18 so that the double back stop 22 is visible between the first and second racks 16, 20. FIG. 3 illustrates the second pallet 18 positioned on the second rack 20 and the minimum separation 12 maintained between the first and second pallets 14, 18 by the double back stop 22. In an exemplary embodiment, the minimum separation 12 may be selected based on one or more insurance and/or legal regulations. In another exemplary embodiment, the minimum separation 12 may be selected within a range of 5-7 inches, such as 6 inches, for example. However, the embodiments of the system 10 and the double back stop 22 are not limited to any specific range of minimum separation 12 and may be employed to maintain any minimum separation between pallets positioned on adjacent racks.

As further illustrated in FIGS. 2-3, the double back stop 22 includes a first back stop 24 attached to the first rack 16 to prevent lateral movement of the first pallet 14 beyond the first back stop 24. The double back stop 22 depicted in FIGS. 2-3 also includes a second back stop 26 attached to the second rack 20 to prevent lateral movement of the second pallet 18 beyond the second back stop 26. As illustrated in FIG. 3, a minimum distance 25 is maintained between the first backstop 24 and the second backstop 26, so that the minimum separation 12 is maintained between the first and second pallets 14, 18. In an exemplary embodiment, the minimum distance 25 is approximately equal to the minimum separation 12. However, the minimum distance 25 may be less than the minimum separation 12, provided that the minimum separation 12 is maintained between the pallets 14, 18. FIGS. 2-3 further illustrate that the minimum distance 25 between the first and second backstops 24, 26 is maintained by a middle section 28 connecting the first back stop 24 to the second back stop 26 such that the first back stop 24 and the second back stop 26 are spaced apart by the minimum distance 25. As illustrated in FIG. 3, a length of the middle section 28 between the first back stop 24 and the second back stop 26 is the minimum distance 25.

Figure 4:
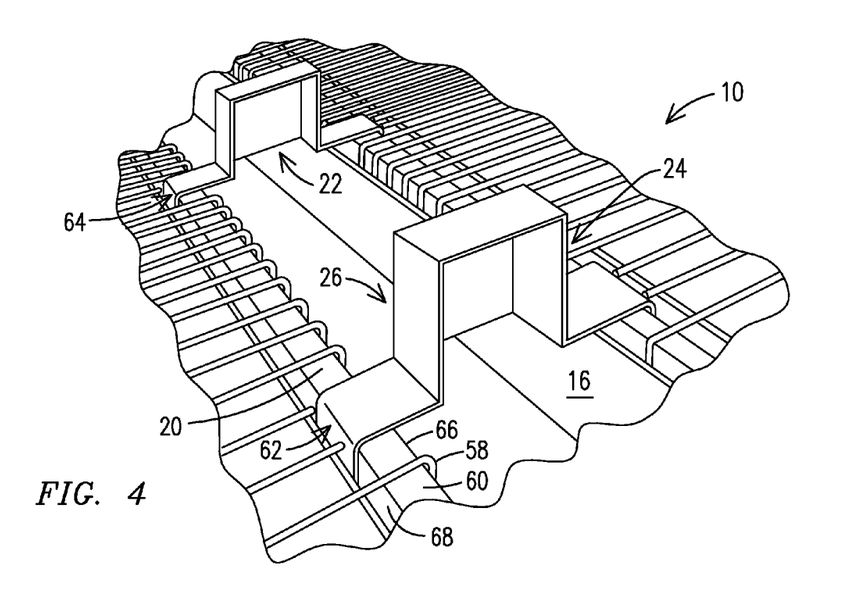
FIG. 4 is a perspective view of the system of FIG. 2 without the first and second pallets positioned on the first and second racks.

FIG. 4 illustrates the system 10 without the first and second pallets 14, 18 positioned on the first and second racks 16, 20. As shown in FIG. 4, the first and second racks 16, 20 include a grating 58 that extends across a top of the first and second racks 16, 20 and over an outer surface 66 of a side 60 of the first and second racks 16, 20. However, the grating 58 does not extend beyond the outer surface 66 of the side 60 of the first and second racks 16, 20 at attachment locations 62, 64 along the first and second racks 16, 20, where the first and second back stops 24, 26 are attached to the side 60 of the first and second rack 16, 20. As further illustrated in FIG. 4, the first and second back stop 24, 26 attach to the racks 16, 20 by extending over an inner surface 68 of the side 60 of the first and second side racks 16, 20 to the attachment locations 62, 64. The first and second racks 16, 20 and the grating 58 structural arrangement of FIG. 4 is merely one exemplary embodiment of a pair of racks that can be used with the double back stop 22 of the present invention. Indeed, the embodiments of the double back stop 22 discussed herein may be used to maintain the minimum separation 12 between pallets positioned on any pair of adjacent racks constructed from any structural components.

Figure 5:
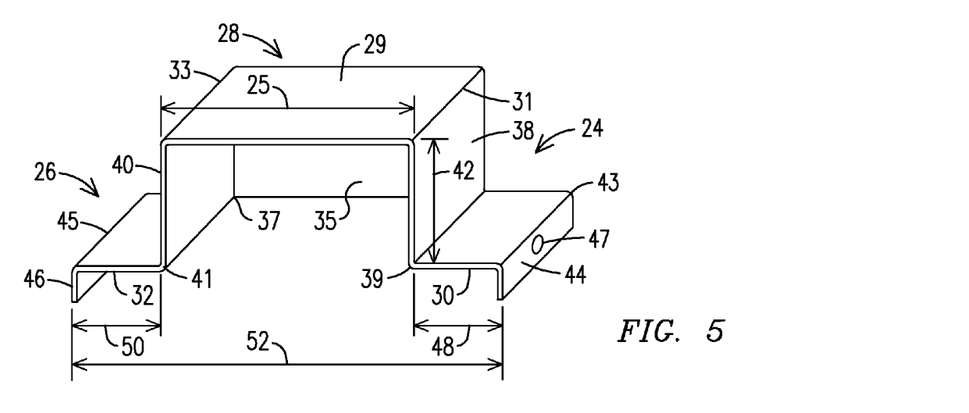
FIG. 5 is a perspective view of an exemplary embodiment of the double back stop of the system of FIG. 2.

FIG. 5 illustrates the double back stop 22 that is attached to the first and second racks 16, 20 of the system 10 discussed above. The double back stop 22 includes the first back stop 24 discussed above which includes a first horizontal member 30 configured to extend across a top of the first rack 16. The first back stop 24 also includes a first back stop member 38 to extend upward from the first horizontal member 30 by a height 42 to prevent lateral movement of the first pallet 14 beyond the first back stop 24. In an exemplary embodiment, the height 42 may be selected based on a height of the first pallet 14. For example, the height 42 may be selected to be less than the height of the first pallet 14. In an exemplary embodiment, the height 42 may be selected in a range of 3-5 inches, such as 4 inches, for example. The first back stop 24 also includes a first attachment member 44 that extends downward from the first horizontal member 30 by a length along the inner surface 68 of the side 60 of the first rack 16 to attach the first back stop 24 to the first rack 16. In an exemplary embodiment, the length of the first attachment member 44 may be selected in a range of 1-2 inches, such as 1 inch, for example.

As illustrated in FIG. 5, the double back stop 22 also includes the second back stop 26 discussed above which includes a second horizontal member 32 configured to extend across a top of the second rack 20. The second back stop 26 also includes a second back stop member 40 to extend upward from the second horizontal member 32 by a height 42 to prevent lateral movement of the second pallet 18 beyond the second back stop 26. As with the first back stop member 38, the height 42 of the second back stop member 40 may be selected based on a height of the second pallet 18. For example, the height 42 may be selected to be less than the height of the second pallet 18. In an exemplary embodiment, the height 42 may be selected within a range of 3-5 inches, such as 4 inches, for example. The second back stop 26 also includes a second attachment member 46 that extends downward from the second horizontal member 32 by a length along the inner surface 68 of the side 60 of the second rack 20 to attach the second back stop 26 to the second rack 20.

FIG. 5 further illustrates that the first attachment member 44 includes a hole 43 configured to pass a fastener (not shown) through the first attachment member 44 and the first rack 16, in order to attach the first back stop 24 to the first rack 16. Similarly, the second attachment member 46 includes a hole 43 configured to pass a fastener through the second attachment member 46 and the second rack 20, in order to attach the second back stop 26 to the second rack 20. After the first and second attachment members 44, 46 are extended along the inner surface 68 of the side 60 of the first and second racks 16, 20, the fastener is passed through the holes 43 and into the inner surface 68, to secure the first and second back stops 24, 26 to the first and second racks 16, 20. In an exemplary embodiment, the holes 43 may have a diameter in a range of $\frac{1}{8}$-$\frac{1}{2}$ inches, such as $\frac{1}{4}$ inches for example.

FIG. 5 further illustrates that the double back stop 22 includes the middle section 28 with a horizontal cross-member 29 that interconnects the first back stop member 38 with the second back stop member 40 along a top of the first back stop member 38 and a top of the second back stop member 40. As illustrated in FIG. 5, the length of the horizontal cross-member 29 is the minimum distance 25. Additionally, as illustrated in FIG. 5, the middle section 28 includes a vertical cross-member 35 that interconnects the first back stop member 38 to the second back stop member 40 along a center 37 of a width of the first and second back stop members 38, 40. Although the embodiment of the vertical cross-member 35 depicted in FIG. 5 interconnects the first and second back stop members 38, 40 along the center 37 of their width, the embodiments of the present invention may position the vertical cross-member 35 to interconnect the first and second back stop members 38, 40 at any region along a width of the first and second back stop members 38, 40. In an exemplary embodiment, the vertical cross-member 35 enhances the structural integrity of the double back stop 22 in the presence of lateral loads imposed by the first and second pallets 14, 18 against the first and second back stop members 38, 40. In an exemplary embodiment, when the vertical cross-member 35 is integrally connected to the double back stop 22 other than with a welding operation, the vertical cross-member 35 enhances the structural integrity of the double back stop 22, to withstand up to 3000 pounds of lateral force imposed by the first and second pallets 14, 18 on the first and second back stop members 38, 40. In another exemplary embodiment, when the vertical cross-member 35 is integrally connected to the double back stop 22 with a welding operation, the structural integrity of the double back stop 22 is enhanced to withstand up to 4900 pounds of lateral force imposed by the first and second pallets 14, 18 on the first and second back stop members 38, 40. These numerical force thresholds are merely exemplary and the embodiments of the present invention are not limited to these thresholds and the double back stop may be designed to withstand greater force threshold of the lateral loads imposed by the first and second racks on the double back stop.

As illustrated in FIG. 5, a length 52 of the double back stop 22 is a sum of a length 48 of the first horizontal member 30, a length 50 of the second horizontal member 32 and the minimum distance 25 length of the middle section 28. As previously discussed, in an exemplary embodiment, the minimum distance 25 is the minimum separation 12. In one exemplary embodiment, the length 48, 50 of each of the first and second horizontal members 30, 32 is one half of the difference between the length 52 of the double back stop 22 and the minimum separation 12. In another exemplary embodiment, the length 48, 50 of each of the first and second horizontal members 30, 32 is in a range of 4-6 inches, such as 5 inches, for example. As further illustrated in FIG. 2, the first and second horizontal members 30, 32 each include a rack overhang portion 54 that extends over the side 60 of the rack 16, 20 to attach the double back stop 22 to the racks 16, 20. Additionally, as illustrated in FIG. 2, the first and second horizontal members 30, 32 each include a pallet overhang portion 56 that vertically supports the first and second pallets 14, 18 between the first and second racks 16, 20.

In one embodiment of the present invention, the first and second back stop members 38, 40 and the horizontal cross-member 29 are made from an integral piece of material, such as an integral piece of steel material, for example. The vertical cross-member 35 is integrally connected to the integral piece of material, such as with a welding operation, for example. FIG. 3 depicts the welding joint 27 between the vertical cross-member 35 and the first and second back stop members 38, 40 and the horizontal cross-member 29. As illustrated in FIG. 5, to form the double back stop 22, the integral piece of material is bent along a first line 31, to form the first back stop member 38 and is bent along a second line 33, to form the second back stop member 40. The integral piece of material is then bent along a third line 39, to form the first horizontal member 30 and is bent along a fourth line 41, to form the second horizontal member 32. The integral piece of material is then bent along a fifth line 43, to form the first attachment member 44 and is bent along a sixth line 45, to form the second attachment member 46. The lines 31, 33, 39, 41, 43, 45 are spaced apart along the integral piece of material, based on the desired lengths of each of the parts of the double back stop 22. For example, the first and second lines 31, 33 are spaced apart by the minimum separation 12, so that the minimum distance 25 length of the middle section 28 is the minimum separation 12. In an exemplary embodiment, the integral piece of material is bent at approximate orthogonal angles along each of the lines 31, 33, 39, 41, 43, 45, as depicted in FIG. 5. In another exemplary embodiment, the integral piece of material may have a length in a range of 14-17 inches, a width in a range of 2-4 inches and a thickness in a range of $\frac{1}{16}$-$\frac{1}{4}$ inches, for example.

Figure 6:
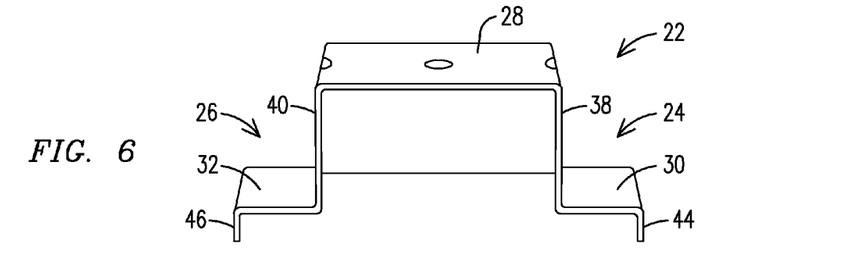
FIG. 6 is a front perspective view of the double back stop of FIG. 5.
Figure 7:
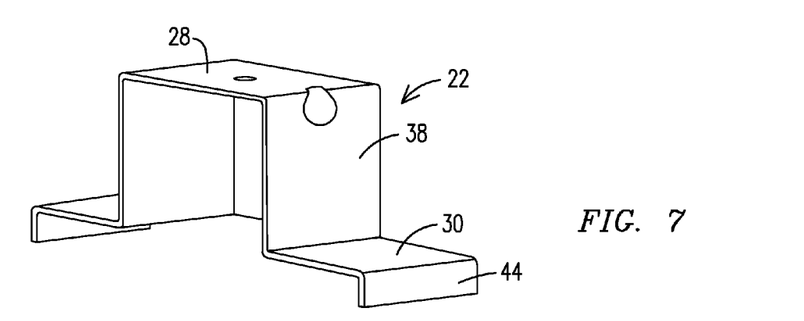
FIG. 7 is a side perspective view of the double back stop of FIG. 5.
Figure 8:
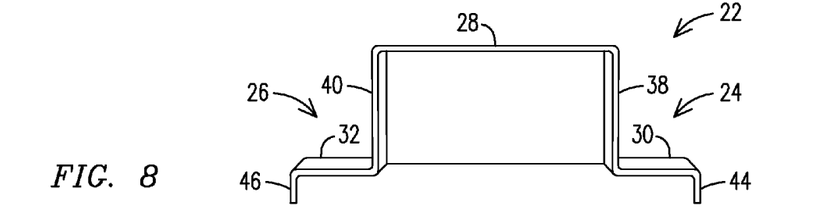
FIG. 8 is a front view of the double back stop of FIG. 5.

FIGS. 6-8 illustrate additional views of the double back stop 22 from different angular perspectives, with the structural features previously discussed.

Figure 9:
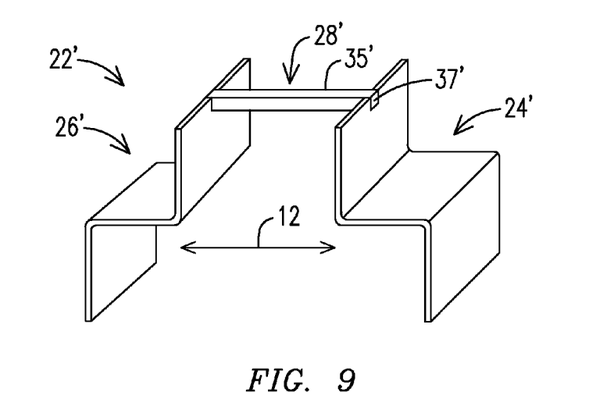
FIG. 9 is a top perspective view of an alternate embodiment of the double back stop of the system of FIG. 2.

FIG. 9 illustrates an alternate embodiment of the double back stop 22' that can be used to maintain the minimum separation 12 between the pallets 14, 18 in the system 10 of FIGS. 2-3. The double back stop 22' includes the middle section 28' that connects the first back stop 24' to the second back stop 26' with a vertical cross-member 35' and without a horizontal cross-member. As with the middle section 28 of FIG. 5, the length of the middle section 28' is the minimum distance 25. In an exemplary embodiment, the minimum distance 25 is the minimum separation 12 required to be maintained between the pallets 14, 18. Unlike the double back stop 22 of FIG. 5, the first back stop 24', the second back stop 26' and the middle section 28' are not formed from bending an integral piece of material at spaced apart locations. Instead, the middle section 28' is integrally connected to each of the first back stop 24' and the second back stop 26, such as with a welding operation, for example.

Figure 10:
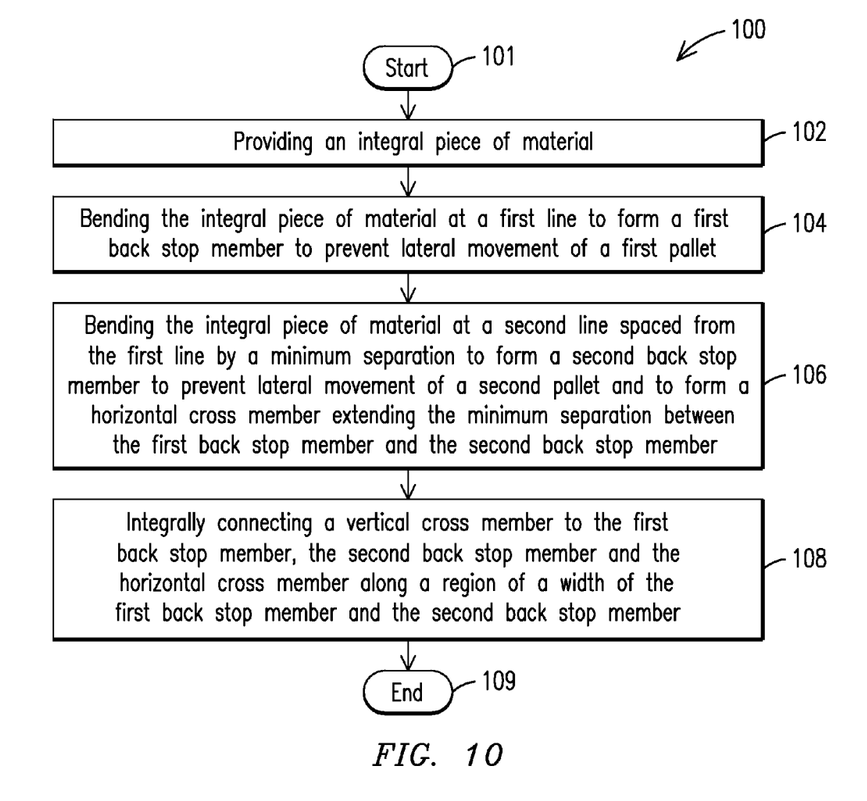
FIG. 10 is a flowchart illustrating an exemplary embodiment of a method for forming the double back of FIG. 2.

FIG. 10 illustrates a flowchart depicting a method 100 for forming the double back stop 22 to maintain the minimum separation 12 between the first pallet 14 positioned on the first rack 16 and the second pallet 18 positioned on the second rack 20. The method 100 starts at 101 by providing 102 an integral piece of material. The method 100 then includes bending 104 the integral piece of material at the first line 31 to form the first back stop member 38 to prevent lateral movement of the first pallet 14 beyond the first back stop member 38, when the first pallet 14 engages the first back stop member 38. The method 100 then involves bending 106 the integral piece of material at the second line 33 spaced from the first line 31 by the minimum separation 12 to form the second back stop member 40 to prevent lateral movement of the second pallet 18 beyond the second back stop member 40 when the second pallet 18 engages the second back stop member 40. Additionally, the bending 106 step is performed, to form the horizontal cross member 29 extending the minimum distance 25 between the first back stop member 38 and the second back stop member 40. In an exemplary embodiment, the minimum distance 25 is the minimum separation 12. The method 100 may also include integrally connecting 108 the vertical cross-member 35 to the first back stop member 38, the second back stop member 40 and the horizontal cross member 29 along a region of a width of the first back stop member 38 and the second back stop member 40, such as the center 37 of the width, before the method 100 ends at 109.

Figure 11:
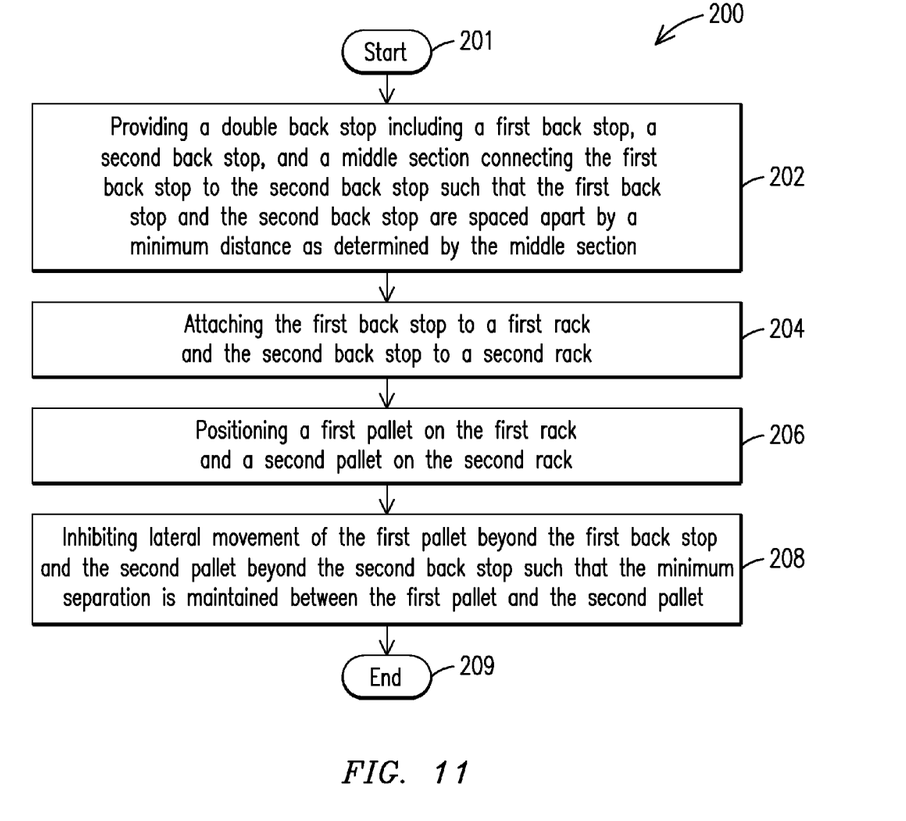
FIG. 11 is a flowchart illustrating an exemplary embodiment of a method for maintaining a minimum separation between a first pallet positioned on a first rack and a second pallet positioned on a second rack.

FIG. 11 illustrates a flowchart depicting a method 200 for maintaining the minimum separation 12 between the first pallet 14 positioned on the first rack 16 and the second pallet 18 positioned on the second rack 20. The method 200 begins at 201 by providing 202 the double back stop 22 including the first back stop 24, the second back stop 26 and the middle section 28 connecting the first back stop 24 to the second back stop 26 such that the first back stop 24 and the second back stop 26 are spaced apart by the minimum distance 25 as determined by the middle section 28. The method 200 further includes attaching 204 the first back stop 24 to the first rack 16 and the second back stop 26 to the second rack 20. The method 200 further includes positioning 206 the first pallet 14 on the first rack 16 and the second pallet 18 on the second rack 20. The method 200 further includes inhibiting lateral movement 208 of the first pallet 14 beyond the first back stop 24 and the second pallet 18 beyond the second back stop 26 such that the minimum separation 12 is maintained between the first pallet 14 and the second pallet 18, before the method 200 ends at 209.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

That which is claimed is:

1. A system for maintaining a minimum separation between a first pallet positioned on a first rack and a second pallet positioned on a second rack, said system comprising:
   a double back stop including
   a first back stop configured to attach to the first rack and to prevent lateral movement of the first pallet beyond the first back stop;
   a second back stop configured to attach to the second rack and to prevent lateral movement of the second pallet beyond the second back stop such that the minimum separation is maintained between the first and second pallets; and
   a middle section to connect the first back stop to the second back stop to maintain a minimum distance between the first back stop and the second back stop such that the minimum separation is maintained between the first and second pallets, the middle section includes a horizontal cross-member interconnecting the first back stop member with the second back stop member along a top of the first and second back stop members and a vertical cross-member, the vertical cross-member is a vertical plate that is welded along a center of the first back stop member, the second back stop member, and the middle section; and
   the double back stop withstands lateral forces in the range of 3000 to 4900 pounds.

2. The system of claim 1, wherein the first back stop comprises:
   a first horizontal member configured to extend across a top of the first rack;
   a first back stop member configured to extend from the first horizontal member by a height to prevent the lateral movement of the first pallet beyond the first back stop; and
   a first attachment member configured to extend from the first horizontal member to attach the first back stop to the first rack;
   and wherein the second back stop comprises:
   a second horizontal member configured to extend across a top of the second rack;
   a second back stop member configured to extend from the second horizontal member by a height to prevent the lateral movement of the second pallet beyond the second back stop; and
   a second attachment member configured to extend from the second horizontal member to attach the second back stop to the second rack.

3. The system of claim 2, wherein the first attachment member includes a hole configured to pass a fastener through the first attachment member and the first rack to attach the first back stop to the first rack; and wherein the second attachment member includes a hole configured to pass a fastener through the second attachment member and the second rack to attach the second back stop to the second rack.

4. The system of claim 2, wherein a sum of a length of the first horizontal member and a length of the second horizontal member is a difference between a length of the double back stop and the minimum separation.

5. The system of claim 4, wherein the length of each of the first horizontal member and the second horizontal member is one half of the difference between the length of the double back stop and the minimum separation.

6. The system of claim 4, wherein the length of each of the first horizontal member and the second horizontal member includes a rack overhang portion that is configured to extend over a side of the respective first and second rack and a pallet overhang portion that is configured to support the respective first and second pallet between the first and second racks.

7. The system of claim 1, wherein the system further comprises the first rack and the second rack, wherein the first and second rack comprise a grating that extends over a side of the first and second rack.

8. The system of claim 7, wherein the grating extends along an outer surface of the side of the first and second rack and wherein the first and second back stop extend along an inner surface of the side of the first and second rack.

9. The system of claim 1, wherein the minimum distance is a length of the middle section between the first back stop and the second back stop and wherein the minimum distance is the minimum separation.

10. The system of claim 1, wherein the first and second back stop members and the horizontal cross-member are an integral piece of material.

11. A method for forming a double back stop to maintain a minimum separation between a first pallet positioned on a first rack and a second pallet positioned on a second rack, said method comprising:
providing an integral piece of material;
bending the integral piece of material at a first line to form a first back stop member to prevent lateral movement of the first pallet;
bending the integral piece of material at a second line spaced from the first line by the minimum separation to form a second back stop member to prevent lateral movement of the second pallet and to form a horizontal cross member extending the minimum separation between the first back stop member and the second back stop member; and
integrally welding a vertical cross-member along a center of the first back stop member, the second back stop member, and the horizontal cross member, the vertical cross-member is a vertical plate; and
wherein the double back stop withstands lateral forces in the range of 3000 to 4900 pounds.

12. A method for maintaining a minimum separation between a first pallet positioned on a first rack and a second pallet positioned on a second rack, said method comprising:
providing a double back stop comprising a first back stop, a second back stop and a middle section connecting the first back stop to the second back stop such that the first back stop and the second back stop are spaced apart by a minimum distance as determined by the middle section, the middle section includes a horizontal cross-member interconnecting the first back stop member with the second back stop member along a top of the first and second back stop members and a vertical cross-member, the vertical cross-member is a plate that is welded along a center of the first back stop member, the second back stop member, and the middle section;
attaching the first back stop to the first rack and the second back stop to the second rack;
positioning the first pallet on the first rack and the second pallet on the second rack; and
inhibiting lateral movement of the first pallet beyond the first back stop and the second pallet beyond the second back stop such that the minimum separation is maintained between the first pallet and the second pallet;
wherein the double back stop withstands lateral forces in the range of 3000 to 4900 pounds.

* * * * *